(12) United States Patent
Mahanta et al.

(10) Patent No.: US 11,726,775 B2
(45) Date of Patent: Aug. 15, 2023

(54) SOURCE CODE ISSUE ASSIGNMENT USING MACHINE LEARNING

(71) Applicant: SAP SE, Walldorf (DE)

(72) Inventors: Prabal Mahanta, Bangalore (IN); Vipul Khullar, New Delhi (IN)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 17/349,154

(22) Filed: Jun. 16, 2021

(65) Prior Publication Data
US 2022/0405091 A1 Dec. 22, 2022

(51) Int. Cl.
| | |
|---|---|
| G06F 8/71 | (2018.01) |
| G06F 8/20 | (2018.01) |
| G06F 11/36 | (2006.01) |
| G06N 20/00 | (2019.01) |
| G06F 18/2113 | (2023.01) |
| G06V 10/75 | (2022.01) |

(52) U.S. Cl.
CPC .......... *G06F 8/71* (2013.01); *G06F 8/24* (2013.01); *G06F 11/362* (2013.01); *G06F 11/3604* (2013.01); *G06F 18/2113* (2023.01); *G06N 20/00* (2019.01); *G06V 10/751* (2022.01)

(58) Field of Classification Search
CPC .......... G06F 8/71; G06F 8/24; G06F 11/3604; G06F 11/362; G06N 20/00; G06V 10/751; G06K 9/623
See application file for complete search history.

(56) References Cited

U.S. PATENT DOCUMENTS

| | | | | |
|---|---|---|---|---|
| 10,175,979 | B1 * | 1/2019 | Elwell | G06F 8/71 |
| 10,656,940 | B1 * | 5/2020 | Hogan | G06F 8/73 |
| 10,671,932 | B1 * | 6/2020 | Chen | G06N 5/04 |
| 11,074,062 | B1 * | 7/2021 | Hosic | G06N 3/08 |
| 2014/0130020 | A1 * | 5/2014 | Boshernitsan | G06F 11/368 717/131 |
| 2015/0154497 | A1 * | 6/2015 | Braziunas | G06F 16/93 706/12 |
| 2016/0274995 | A1 * | 9/2016 | Klein | G06F 11/3608 |
| 2018/0329693 | A1 * | 11/2018 | Eksten | G06F 8/65 |
| 2019/0324731 | A1 * | 10/2019 | Zhou | G06N 5/003 |
| 2020/0074369 | A1 * | 3/2020 | Arcolano | G06Q 10/06313 |
| 2021/0064361 | A1 * | 3/2021 | Jayaraman | G06F 8/30 |
| 2021/0263728 | A1 * | 8/2021 | Farrier | G06Q 10/0635 |
| 2021/0303447 | A1 * | 9/2021 | Haze | G06F 11/3664 |
| 2021/0334698 | A1 * | 10/2021 | Vo | G06N 20/00 |

* cited by examiner

*Primary Examiner* — Douglas M Slachta
(74) *Attorney, Agent, or Firm* — Klarquist Sparkman, LLP

(57) ABSTRACT

Technologies are provided for assigning developers to source code issues using machine learning. A machine learning model can be generated based on multiple versions of source code objects (such as source code files, classes, modules, packages, etc.), such as those that are managed by a version control system. The versions of the source code objects can reflect changes that are made to the source code objects over time. Associations between developers and source code object versions can be analyzed and used to train the machine learning model. Patterns of similar changes to various source code objects can be detected and can also be used to train the machine learning model. When an issue is detected in a version of a source code object, the model can be used to identify a developer to assign to the issue. Feedback data regarding the developer assignment can be used to re-train the model.

19 Claims, 9 Drawing Sheets

FIG. 7

| EXAMPLE APPLICATION VERSION HISTORY 700 | | |
|---|---|---|
| APP. VERSION 710 | DEV ID 720 | CHANGE HISTORY 730 |
| 1 711 | DEV 1 721 | SCO 1 V1 731 |
| 2 713 | DEV 2 723 | SCO 2 V1 732, SCO 3 V1 733 |
| 3 715 | DEV 1 721 | SCO 1 V2 734, SCO 4 V1 735 |
| ⋮ | | |
| N 717 | DEV 2 723 | SCO 2 V2 736, SCO 4 V2 737 |

723

719

721

725

SOURCE CODE ISSUE ASSIGNMENT USING MACHINE LEARNING

BACKGROUND

As computer applications have increased in scope and complexity, software developers and quality assurance professionals have begun to make use of automated testing techniques to reduce the time that is required for unit testing and regression testing operations. These techniques include static code analysis techniques for validating the contents of source code, as well as dynamic code analysis techniques for verifying the correctness of executing programs. In some cases, when an issue is detected, it may be possible to isolate a particular piece of source code that is (or may possible be) a cause of the issue. In such cases, the issue may be assigned to a developer that is associated with the identified piece of source code. However, in some cases it may not be possible to identify a developer to assign to the issue. Also, in scenarios where several developers are working on a given application, it may not be clear which of these developers is a good candidate for addressing the issue.

Therefore, there is room for improvement in technologies for determining an appropriate developer to assign to a source code issue.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a method comprises generating a machine learning model using multiple versions of a source code object and identifiers of a plurality of developers associated with the multiple versions of the source code object; receiving an additional version of the source code object; detecting a source code issue in the additional version of the source code object; and using the machine learning model to identify a developer, of the plurality of developers, as a candidate to correct the source code issue in the additional version of the source code object.

In another example embodiment, a system comprises a computing device that comprises a processor and a memory storing instructions that, when executed by the processor, cause the computing device to perform operations, the operations comprising: generating a machine learning model using multiple versions of a source code object and identifiers of a plurality of developers associated with the multiple versions of the source code object; receiving an additional version of the source code object; detecting a source code issue in the additional version of the source code object; and using the machine learning model to identify a developer, of the plurality of developers, as a candidate to correct the source code issue in the additional version of the source code object.

In another example embodiment, one or more computer-readable storage media store instructions that, when executed by one or more processors, cause the one or more processors to perform operations, the operations comprising: generating a machine learning model using multiple versions of a source code object and identifiers of a plurality of developers associated with the multiple versions of the source code object; receiving an additional version of the source code object; detecting a source code issue in the additional version of the source code object; and using the machine learning model to identify a developer, of the plurality of developers, as a candidate to correct the source code issue in the additional version of the source code object.

As described herein, a variety of other features and advantages can be incorporated into the technologies as desired.

BRIEF DESCRIPTION OF THE DRAWINGS

FIG. 7 is a diagram depicting an example application version history.

DETAILED DESCRIPTION

Example 1—Overview

Figure 1:
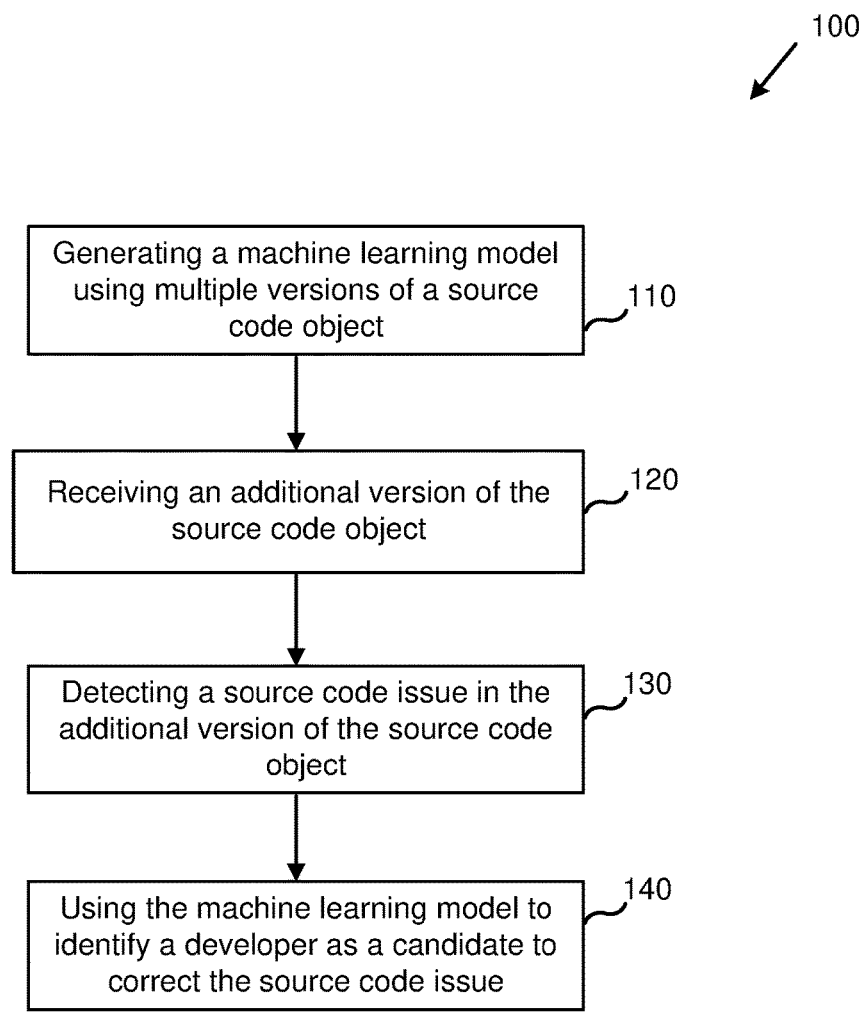
FIG. 1 is a flowchart of an example method for determining a developer as a candidate to correct a source code issue using machine learning.

The description provided herein is directed to various technologies for determining candidate developers to assign to address source code issues using machine learning.

When an issue is detected as a part of application code analysis and/or testing, it may be possible to identify a unit of source code that is a cause of the issue. In some cases, the issue may be assigned to a developer that is associated with the identified piece of source code (such as a developer who checked the unit of source code into a version control system). However, in some cases it may not be possible to identify a developer to assign to the issue. For example, a developer associated with the unit of source code may no longer be actively working on the application. Also, it is possible that a developer who is associated to a particular piece of source code may not be the best candidate to fix an issue arising out of that source code. For example, a developer that caused an issue may be inexperienced with the particular piece of source code, and another developer who has more familiarity with it may be a better candidate to fix the problem. Also, in scenarios where several developers are working on a given application, it may not be clear which of these developers is a good candidate for addressing the issue.

At least some of the embodiments disclosed herein address these problems by using machine learning to analyze source code and to identify developers as candidates for addressing source code issues. A machine learning model can be generated based on an application version history in a version control system. Multiple versions of source code objects (such as source code files, classes, modules, packages, etc.) can be used to generate a machine learning model. The versions of the source code objects that are stored in a version control system can reflect changes to the source code objects that are made over time. The version control system can also track which developers were responsible for making the changes to the source code objects. These associations between developers and source code object versions (which can also be referred to as "change ownership") can be analyzed and used to train the machine learning model. Patterns of similar changes to various source code objects (which can also be referred to as "change signatures") can be detected and can also be used to train the machine learning model.

When a source code issue is detected in a version of a source code object, the machine learning model can be used to identify one or more developers as candidates for addressing the issue. In at least some cases, feedback data regarding a suggested developer can be used to update or re-train the machine learning model.

Example 2—Example Systems and Methods for Determining Candidate Developers to Correct Source Code Issues Using Machine Learning In any of the examples described herein, systems and methods can be provided for determining candidate developers using machine learning.

FIG. 1 is a flowchart of an example method 100 for determining a developer as a candidate to correct a source code issue using machine learning. Any of the example systems described herein can be used to perform the example method 100. For example, the example system 200 depicted in FIG. 2 can be used to perform all or part of the example method 100.

Figure 2:
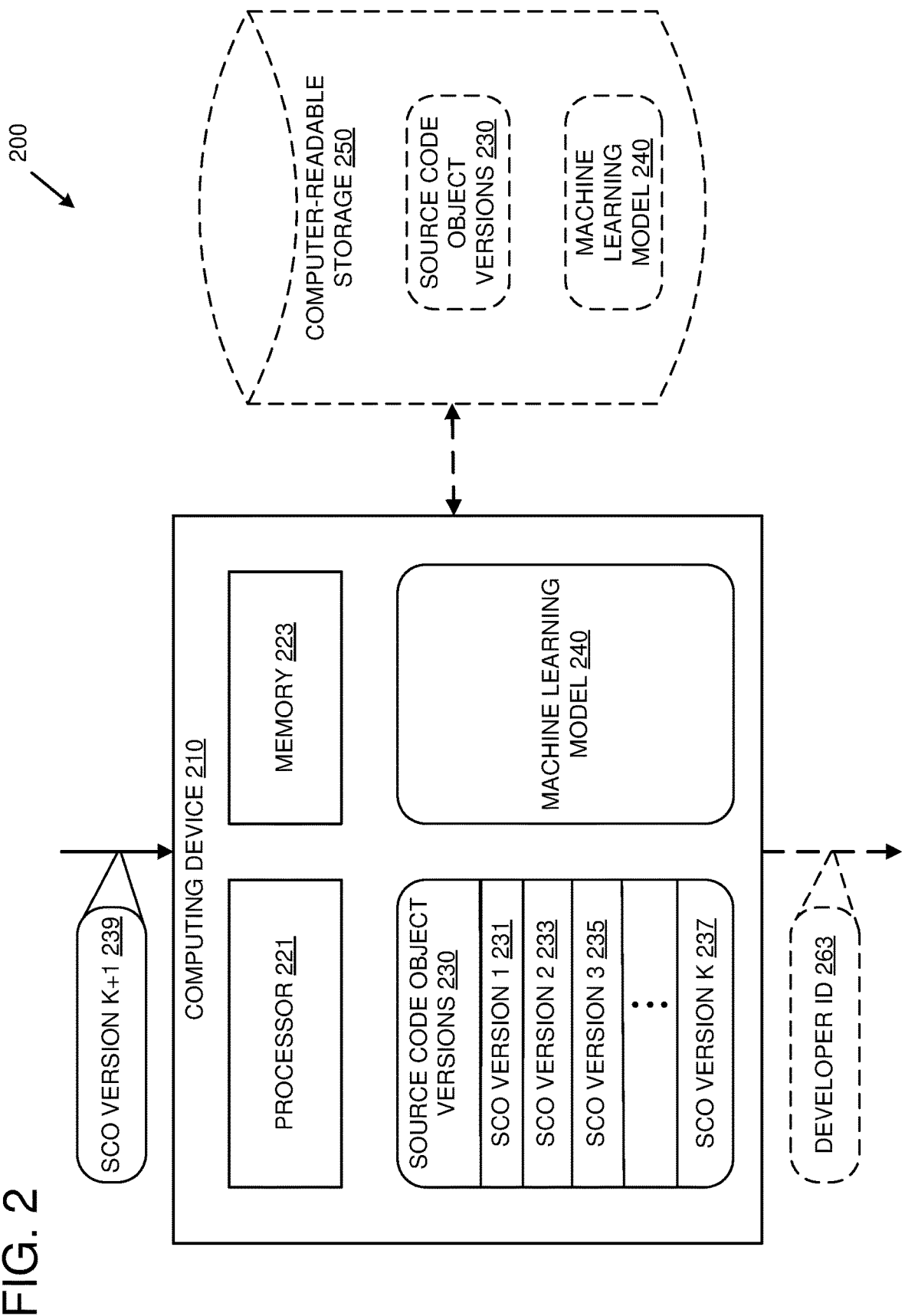
FIG. 2 is a system diagram depicting an example system for determining a developer as a candidate to correct a source code issue using machine learning.

FIG. 2 is a system diagram depicting an example system 200 for determining a developer as a candidate to correct a source code issue using machine learning. The example system 200 comprises a computing device 210 comprising a processor 221 and a memory 223 storing instructions that, when executed by the processor 221, cause the computing device 210 to perform operations as described herein.

At 110, a machine learning model is generated using multiple versions of a source code object. The machine learning model can also be generated using identifiers for a plurality of developers associated with the multiple versions of the source code object. For example, the computing device 210 can generate a machine learning model 240 using multiple versions of a source code object ("SCO") 230. In at least some embodiments, the multiple versions of the source code object 230 can be associated with identifiers of a plurality of developers. For example, the SCO version 231 can be associated with an identifier for a first developer and the SCO version 233 can be associated with an identifier for a second developer. The identifier associated with a given SCO version can be an identifier for a developer that made a source code change that caused the given SCO version to be created (such as by committing or checking-in a change to the SCO in a version control system).

Optionally, the example system 200 can comprise a computer-readable storage 250 storing the SCO versions 230. For example, the SCO versions 230 can be stored in the computer-readable storage 250 by a version control system (not shown). The computing device 210 can retrieve the source code object versions 230 from the computer-readable storage 250 via one or more wired and/or wireless communication channels. Additionally or alternatively, the computing device 210 can be configured to store the machine learning model 240 in the computer-readable storage 250.

In at least some embodiments, generating the machine learning model 240 can comprise identifying one or more source code objects related to the source code object. For example, the computing device 210 can identify one or more source code objects related to one or more of the SCO versions 230. In at least some embodiments, identifying the one or more source code objects comprises determining that the one or more source code objects are in a hierarchical relationship with the source code object. Once the one or more source code objects related to the source code object have been identified, multiple versions of the one or more related source code objects, and the multiple versions of the source code object 230, can be analyzed by the computing device 210 to create the machine learning model 240.

In at least some embodiments, generating the machine learning model 240 can comprise generating feature sets for the multiple versions of the source code object 230, comparing the feature sets to one another, and generating similarity scores for the multiple versions of the source code object 230 based on the comparing. In at least some such embodiments, generating the feature sets for the multiple versions of the source code object comprises generating abstract syntax trees for the multiple versions of the source code object and creating the feature sets using the abstract syntax trees. In an embodiment where the computing device 210 generates the machine learning model 240 based on the multiple versions of the source code object 230 and multiple versions of one or more other source code objects that are related to the source code object, the computing device can generate feature sets for the multiple versions of the source code object 230 and can generate feature sets for the multiple versions of the one or more related source code objects. In such an embodiment, the computing device 210 can compare the feature sets of the versions of the source code object 230 and the related one or more source objects to one another and can generate similarity scores for the multiple versions of the source code object 230 and the multiple versions of the one or more related source code objects based on the comparing. In at least some such embodiments, the computing device can generate similarity scores for the related source code objects which indicate how similar the source code objects are to one anther across the multiple versions of the source code objects. Once the computing device 210 has generated similarity scores, the similarity scores can be used to generate the machine learning model 240.

In a different or further embodiment, generating the machine learning model 240 comprises identifying versions of the source code object, of the multiple versions of the source code object 230, that are associated with a same developer identifier and determining a coding signature for a developer associated with the developer identifier. For example, the computing device 210 can determine that the SCO version 233 and the SCO version 237 are associated with a same developer identifier. Based on this, the computing device 210 can determine a coding signature for a developer associated with the developer identifier. In an embodiment where versions of one or more other source code objects that are related to the source code object are also analyzed, the computing device can identify versions of any related source code objects that are also associated with the same developer identifier and can use these as an additional basis for the coding signature. This process can be repeated for any additional developer identifiers that are associated with other versions of the source code object (and/or any versions of any related source code objects). The coding signatures for the developers can be used in the generating of the machine learning model 240.

At 120, an additional version of the source code object is received. For example, an additional source code object version 239 can be received by the computing device 210. In at least some embodiments, the computing device can receive the SCO version 239 from a version control system. Alternatively, the computing device 210 can comprise a version control system that receives changes to the SCO and generates the new version of the SCO 239 based on the received changes. In an embodiment where versions of source code objects are stored in the computer-readable storage 250 by a version control system, the computing device 210 can be configured to retrieve the additional SCO version 239 from the computer-readable storage 250. In at least some such embodiments, the computing device 210 can be configured to poll the version control system for new versions and/or receive a notification from the version control system when a new version is created.

At 130, a source code issue is detected in the additional version of the source code object. For example, the computing device 210 can be configured to detect a source code issue in the SCO version 239. In at least some embodiments, the source code issue can be a static code issue detected during a static source code analysis of the additional version of the source code object 239. Such static source code analysis can comprise analysis of source code contained within the additional version of the source code object 239. Additionally or alternatively, the source code issue can comprise a dynamic code issue detected during a dynamic analysis of an application (or library, module, etc.) containing a compiled representation of the additional version of the source code object 239. For example, the computing device 210 can be configured to execute a build process that generates an executable representation of an application containing the additional version of the source code object 239 and can execute a test suite against the executable representation of the application. An error or exception caused by an executable representation of the additional version of the source code object 239 can be identified as a source code issue in the additional version of the source code object 239.

At 140, the machine learning model is used to identify a developer as a candidate to correct the source code issue in the additional version of the source code object. For example, the computing device 210 can use the additional version of the source code object 239 to identify a developer as a candidate to correct the source code issue. For example, the computing device 210 can provide the additional version of the source code object 239 and the machine learning model 240 as input for a machine learning algorithm that produces an identifier 263 associated with a developer as output. In at least some embodiments, a developer identifier associated with the additional SCO version 239 can also be provided as input to the machine learning algorithm. Optionally, the computing device 210 can transmit the developer identifier 263 to another computing device. Additionally or alternatively, the computing device 210 can assign the source code issue to a developer associated with the developer identifier 263. For example, the computing device 210 can create an entry in an issue tracking system for the source code issue and can assign the entry to the developer associated with the developer identifier 263.

In at least some embodiments, feedback related to the identification of the developer as a candidate can be received and used to update the machine learning model. For example, the computing device 210 can be configured to receive feedback indicating whether the assignment of the developer identifier 263 was correct or incorrect. In at least some embodiments, if the assignment of the developer identifier 263 was incorrect, the feedback can comprise a developer identifier associated with a different developer that should have been assigned to the source code issue. The computing device 210 can use the feedback to update and/or retrain the machine learning model 240.

Example 3—Example Systems and Methods for Generating Machine Learning Models

Figure 3:
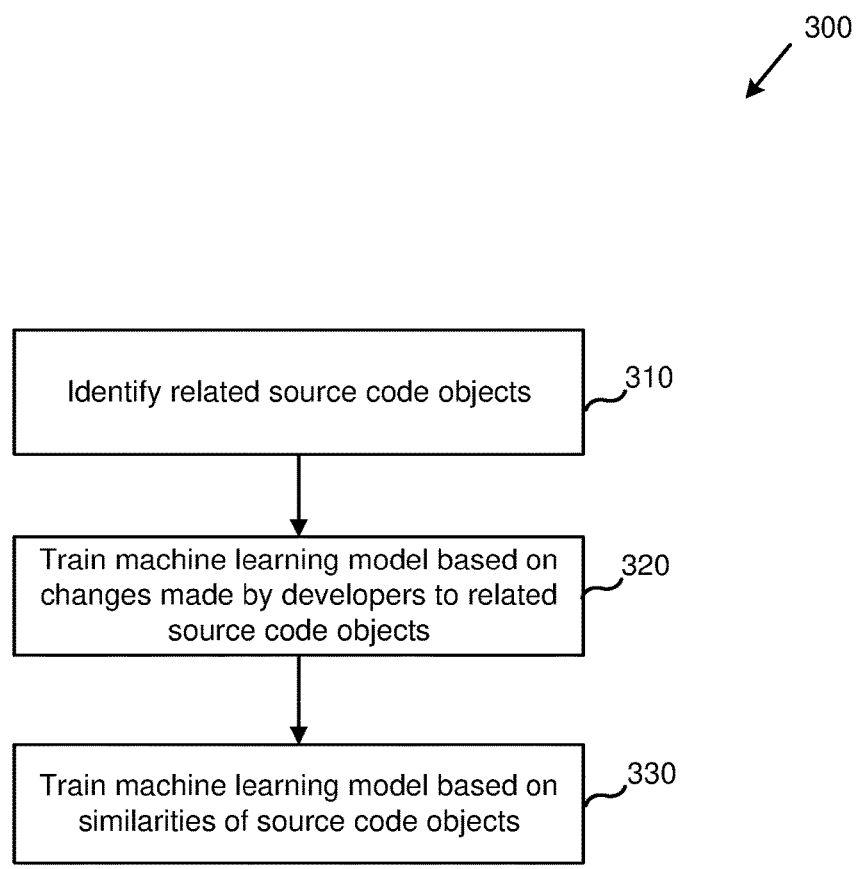
FIG. 3 is a flowchart of an example method for generating a machine learning model for use in determining candidate developers to correct source code issues.

FIG. 3 is a flowchart of an example method 300 for generating a machine learning model for use in determining candidate developers to correct source code issues. Any of the example systems described herein can be used to perform the example method 300. For example, the example system 200 depicted in FIG. 2 can be used to perform all or part of the example method 300.

At 310, related source code objects are identified. For example, versions of the source code objects can be analyzed to identify relationships between the source code objects that are defined in the source code contents of the versions of the source code objects. Example relationships include association relationships, possession relationships, inheritance relationships, implementation relationships, etc. In at least some embodiments, source code objects can also be organized in one or more hierarchical relationships (such as parent-child relationships, and base class—sub-class relationships). Additionally or alternatively, the relationships between the source code objects can comprise organizational relationships (such as source code objects that belong to a same module, package, etc.) Additionally or alternatively, the relationships between the source code objects can comprise naming relationships (such as when multiple source code objects have the same or similar names). After the related source code objects are identified, the they can be grouped together and the groups of related source code objects can be analyzed.

At 320, a machine learning model is trained based on changes made by developers to related source code objects. For example, changes made to a given source code object by a given developer can be identified by detecting versions of the source code object that are associated with the given developer. If the given developer is associated with one or more versions of the given source code object, then source code objects that are related to the given source code object can also be analyzed to determine whether or not the given developer is associated with the versions of the related source code objects. A weight can be assigned to a relationship between the developer and the given source code object based on a number and/or frequency of changes made by the developer to the source code object and the related source code objects. This weight can reflect a likelihood that the given developer is a good candidate for addressing source code issues that arise out of versions of the source code object. This analysis can be repeated with respect to the given source code object and every developer known to the system. The analysis can then be repeated for every other source code object and developer combination.

The weights can be generated and assigned to the relationships between the developers and the source code objects as part of a machine learning model training process. The machine learning model training process can generate a machine learning model data structure which models the relationships between the developers and the source code objects and the system and the associated weights assigned to those relationships.

At 330, the machine learning model is trained based on similarities of the source code objects. For example, the weights that are assigned to the relationships between the developers and the source code objects can be adjusted based on similarities among the source code objects. In at least some embodiments, identifying similarities of the source code objects comprises parsing source code contained within the source code objects (such as versions of source code contained within the versions of the source code objects). For the source code in a given source code object (or within a given version of the source code object) program features (such as program bodies, variable declarations, variable types, class definitions, function definitions, property definitions, etc.) can be extracted from the poorest source code. In at least some embodiments, abstract syntax trees can be created which model the relationships among the extracted program features. In some such embodiments, the abstract syntax trees can be used to create dependency maps which reflect dependencies among different source code objects.

The extracted program features can be used to create feature sets that are associated with the source code objects (or with the versions of the source code objects). These feature sets can be compared to one another to determine similarities scores which indicate how similar features of the various source code objects are to one another. The similarities scores can be used to further train the machine learning model. For example, the weights that are assigned to relationships between the developers and the source code objects can be adjusted further based on similarities scores for the source code objects. Additionally or alternatively, further weights can be generated based on the similarity scores, and associated with relationships between the various source code objects.

In at least some embodiments, the similarities of the source code objects can include similarities of changes that are made to the source code objects over time. These changes can be detected by comparing versions of the source code objects to one another. Patterns of changes that are detected can be used to identify change signatures, such as similar changes that are made to related source code objects. These patterns of changes can be used to adjust the weights assigned to relationships between developers and source code objects in at least some scenarios. For example, if a developer is highly correlated with one source code object, and that source code object has experienced a change that is similar to a change that was made to another source code object, then a weight assigned to a relationship between the developer and the another source code object can be increased.

In at least some embodiments, the machine learning model can be retrained over time. For example, feedback data which reflects the accuracy of predictions made using the machine learning model can be used to adjust the model weights. Additionally or alternatively, as additional versions of source code objects are added to the system, the machine learning model can be retrained to account for this additional information. Additionally or alternatively, changing statuses of the developers can be taken into consideration. For example, the training process can detect developers that have transitioned from an active status to an inactive status (for example, indicating that these developers are no longer working on the source code for the application). When the system detects that a developer has transitioned from active status to in an active status, the system can reflect this in the machine learning model by changing all weights associated with the developer to zero. Additionally or alternatively, the machine learning model can be retrained using a training process that excludes the inactive developers from consideration.

Although steps 320 and 330 are depicted in FIG. 3 as executing sequentially, in at least some cases, these steps can execute concurrently or in parallel. For example, step 320 and step 330 can be treated as separate processes which trained separate aspects of the machine learning model concurrently or in parallel. The output of the steps 320 and 330 can then be combined to produce a single machine learning model after both processes have completed.

Example 4—Example Machine Learning Models

In any of the examples described herein, a machine learning model can comprise one or more data structures generated by a machine learning process. Machine learning processes can comprise supervised learning processes, unsupervised learning processes, semi-supervised learning processes, or some combination thereof. Example machine learning models include artificial neural networks, decision trees, support vector machines, hidden Markov models, naïve Bayesian classifiers, etc. A machine learning model can be generated by processing training records using a machine learning process. Training records can comprise one or more input fields (sometimes referred to as independent variables) and one or more output fields (sometimes referred to as dependent variables). A machine learning model can comprise a representation of one or more relationships generalized by a machine learning process based on the training records. In at least some embodiments, the training records can comprise one or more pre-defined test scenarios.

Example 5—Example Artificial Neural Networks

In any of the examples described herein, generating a machine learning model can comprise generating an artificial neural network.

An artificial neural network comprises a plurality of artificial neurons (also referred to as perceptrons or nodes) that can be configured to receive input, combine the input with an internal state (sometimes referred to as activation), and produce an output. In at least some embodiments, a neuron can be associated with an activation threshold which limits an activation of a neuron to scenarios where a given activation value rises above (or falls below) the given threshold. Initial inputs for an artificial neural network can comprise one or more data values. Example inputs can include digital representations of images, documents, data arrays, etc. An ultimate output of an artificial neural network comprises one or more values that represent a result. In at least some embodiments, an activation function can be provided which provides a smooth transition as input values change (e.g., a small change in input produces a small change in output).

The artificial neural network comprises edges (also referred to as connections). An edge connects two neurons and has a direction which identifies one of the neurons as an output neuron and the other neuron as an input neuron. If an activation function of the output neuron generates a value, the value is provided as an input value of the input neuron. An edge can be associated with a weight value that can represent a relative importance of the edge. In such an embodiment, the output value of the output neuron can be modified using the weight value before it is provided to the input neuron. A given neuron can have multiple input and/or output edges.

In at least some artificial neural networks, neurons are organized into multiple layers. Neurons of one layer can connect to neurons of an immediately preceding layer or an immediately following layer. The layer that receives external data as input values can be referred to as an input layer. A layer that produces an ultimate result can be referred to as an output layer. Zero or more layers of neurons can exist between the input layer and the output layer. These layers can be referred to as hidden layers. However, single-layer and unlayered networks are also possible. Various connection patterns can be used to connect the neurons of one layer to neurons of another layer. For example, the neurons of two layers can be fully connected, meaning that every neuron in one layer has edges connecting it to every neuron in the next layer. In another example, connection pools can be used, in which a group of neurons in one layer all have edges connecting to a single neuron in the next layer. In such embodiments, the number of neurons in the next layer can be reduced, thereby concentrating outputs from a larger number of neurons in the preceding layer into a smaller number of neurons in the following layer. Neurons with such connections form a directed acyclic graph and can be referred to as feedforward networks. Alternatively, networks can allow edges between nodes in a same layer and/or from neurons in one layer back to neurons in a preceding layer. Such networks can be referred to as recurrent networks.

An artificial neural network can be trained by adapting the artificial neural network based on sample observations. Training can comprise adjusting weights of edges (and/or optional activation thresholds of neurons) to improve the accuracy of the results generated by the artificial neural network. This can be done by attempting to minimize observed errors. In at least some scenarios, training can be considered to be complete when examining additional observations does not usefully reduce an error rate of the artificial neural network. However, even after an initial training phase, learning can still continue if new results and associated accuracy values cause an error rate of the artificial neural network to fall below a given threshold.

In at least some embodiments, weights can be adjusted based on feedback. Additionally or alternatively, additional input layer nodes and/or additional hidden layer nodes can be added to the artificial neural network in an attempt to increase accuracy in response to feedback.

Feedback data can be received from one or more client computing devices. For example, the feedback data can identify test scenarios which were correctly identified as successes and/or failures and/or test scenarios which were incorrectly identified as successes and/or failures. If errors in the feedback data cause the error rate of the artificial neural network to fall below an acceptable threshold, a server computer can use the feedback data (and optionally all or part of the initial training data) to re-train the artificial neural network; thereby generating an updated artificial neural network. The updated artificial neural network can then be used to perform subsequent exploratory testing. This process can be repeated as additional feedback data is received.

Various modes of training are possible. In at least some embodiments, each input creates one or more weights (and/or one or more activation thresholds) that are used to adjust the values transmitted from one neuron to another. For example, in an embodiment where input layer neurons are associated with user interface controls and hidden layer neurons are associated with test scenarios, weights can be used to change the input values for the controls that are provided to the test scenarios.

Additionally or alternatively, weights (and/or activation thresholds) can be based on a batch of inputs. In at least some scenarios, stochastic learning modes can introduce noise. For example, by using a local gradient calculated from one data point, a chance that the artificial neural network will get stuck in a local minimum can be reduced. However, batch learning modes may yield a faster, more stable descent to a local minimum, since each update can be performed in a direction of the batch's average error. In at least some embodiments, a combination of both types of learning modes can be used.

Figure 4:
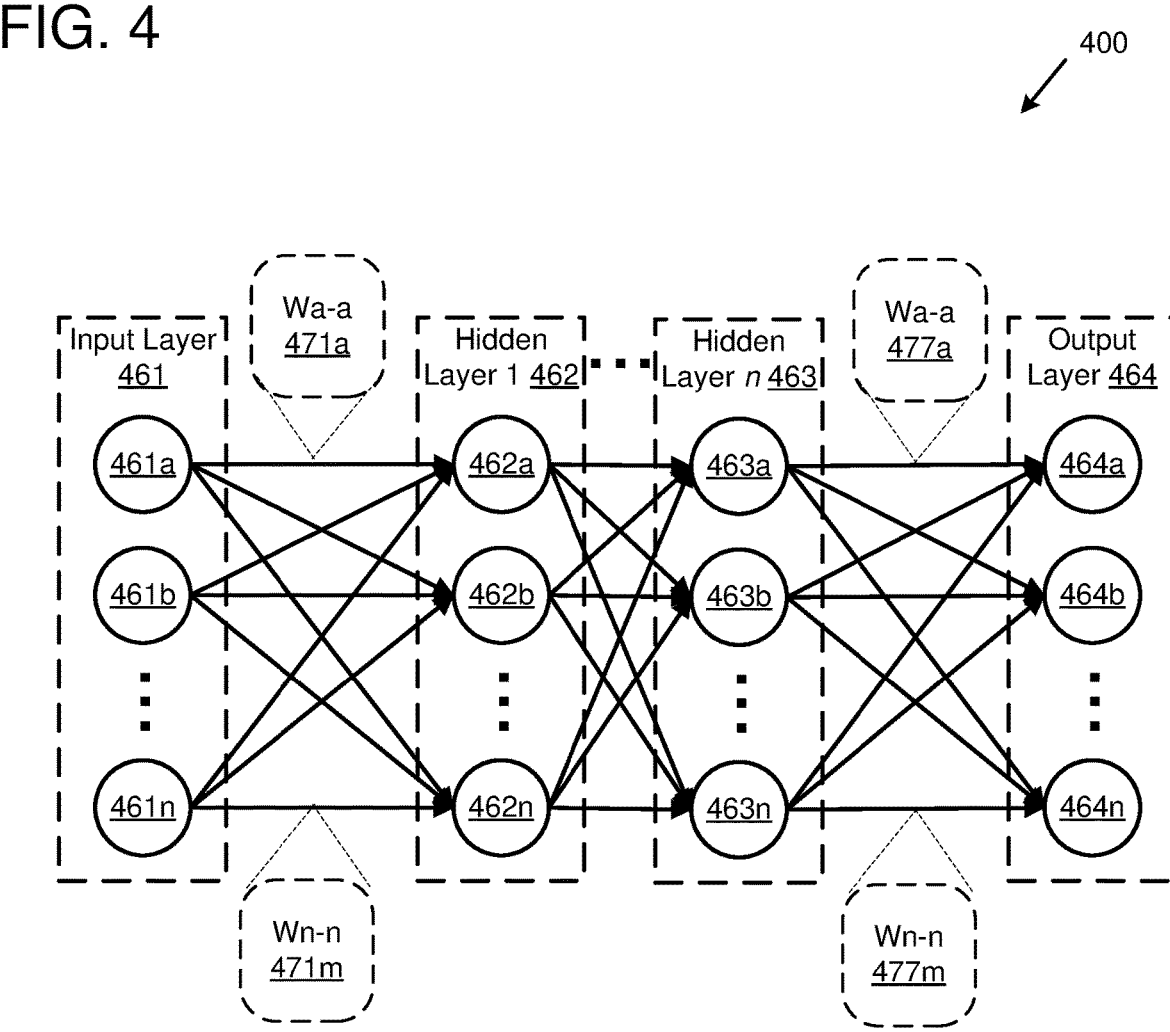
FIG. 4 is a diagram depicting an example artificial neural network.

FIG. 4 is a diagram depicting an example artificial neural network 400. The artificial neural network 400 can comprise a multilayer perceptron neural network. The neural network 400 may have an input layer 461, one or more hidden layers 462, 463, and an output layer 464. Each layer may have one or more nodes (or perceptrons). In at least some embodiments, the number of nodes at each layer is the same across the layers. Thus, the input layer 461 may have input nodes 461a, 461b, through 461n. Similarly, hidden layer 1 462 may have nodes 462a, 462b, though 462n, and so on through hidden layer n 463, which may have nodes 463a, 463b, through 463n. The output layer 464 may have nodes 464a, 464b, through 464n. However, layers with different numbers of nodes are also possible. A node may have one or more parameters, weights, coefficients, or other values, and one or more functions for the various inputs to that node.

The nodes of the artificial neural network 400 can be connected by edges with associated weights (e.g., 471a-471m and 477a-477m). For the sake of clarity, weights are not depicted for every edge depicted in FIG. 4. A weight can be used to modify an output value of a given node. The modified value can then be provided as input to another node. For example, an output of node 461a can be modified using weight 471a before the modified value is provided to node 462a as input.

The input layer 461 can accept an input vector to the neural network 400 and can begin neural network processing. (Although the neural network is referred to here as beginning the "processing," in at least some embodiments the artificial neural network 400 comprises a data structure representation of the neural network and associated executable code contains instructions for performing the processing of the input values through the neural network and producing the output values.) In some embodiments, the input layer 461 does not process the input vectors, other than any preprocessing necessary for the input vectors to be usable by the artificial neural network 400. In other embodiments, the input layer 461 may begin processing the input vectors using the functions and parameters at each node, similar to the hidden layers 462, 463.

The output of each layer can be the output of the various nodes at that layer. Further, nodes at a given layer can accept as input the output of one or more nodes at a preceding layer. For example, the output of input node 461a may be an input to one or more nodes in hidden layer 1 462, and so on for all the nodes in each successive layer. The output layer 464 may contain the final output values for the given input values in aggregate across its nodes 464a, 464b, through 464n. In this way, the artificial neural network 400 may be used to process input vectors through its various layers 461, 462, 463, 464, their respective nodes 461a-n, 462a-n, 463a-n, 464a-n, and their respective parameters and functions. In some embodiments, the layers 461, 462, 463, 464 may have varying numbers of nodes, while in other embodiments the layers may have the same number of nodes.

Example 6—Example Source Code Objects

In any of the examples described herein, a source code object (SCO) comprises one or more statements written in a programming language. Example SCOs include classes, functions, modules, packages, files, HTML documents, etc. In at least some embodiments, a SCO can correspond to a programming language unit that is regarded as a fundamental unit of a programming language. For example, some programming languages (such as JAVA and C#) regard classes as the fundamental units of the programming language. In an embodiment comprising an application definition written in such a programming language, the classes that make up the application definition can be regarded as SCOs. In embodiments where source code is managed by a version control system, SCOs may correspond to units of source code (such as files) that are managed by the version control system. However, it is also possible for units of source code that are treated as SCOs to differ from the units of source code that are managed by the version control system.

In some embodiments, a SCO can comprise a definition of a data structure and definitions of one or more operations that can be performed using portions of the data structure. Examples of such SCO's include classes (such as object-oriented classes). In some such embodiments, the data structure can be a hierarchical data structure. Additionally or alternatively, multiple SCOs may be organized in a hierarchy (such as an inheritance hierarchy that is defined by inheritance relationships between the SCOs). In some cases, a SCO may be referred to as a "business object" and can take any number of forms including business intelligence or performance management components such as those implemented in software technologies of SAP BusinessObjects. However, the use of SCOs in computer applications is not limited to "business" scenarios. SCOs can be used to define a particular application and/or problem domain space. Aspects and artifacts of a given problem domain can be defined using data structures. Various portions of these aspects and/or artifacts can be associated directly or indirectly with definitions of logical operations. Additionally or alternatively, SCOs can comprise units of programming language source code (such as modules, object-oriented class definitions, functions, views, libraries, packages, etc.). In at least some embodiments, SCOs can comprise units of programming language source code that are managed by a version control system. However, it is also possible for units of programming language source code that are managed by a version control system to include multiple SCOs. For example, a version control system may manage source code files which may in turn contain multiple SCOs (such as a scenario where a single source code file contains multiple class definitions). For example, a single file may contain multiple class definitions or a class may be defined by multiple files. In such scenarios, a version control system may manage the source code at the file level, while the class definitions are treated as the SCOs.

Figure 5:
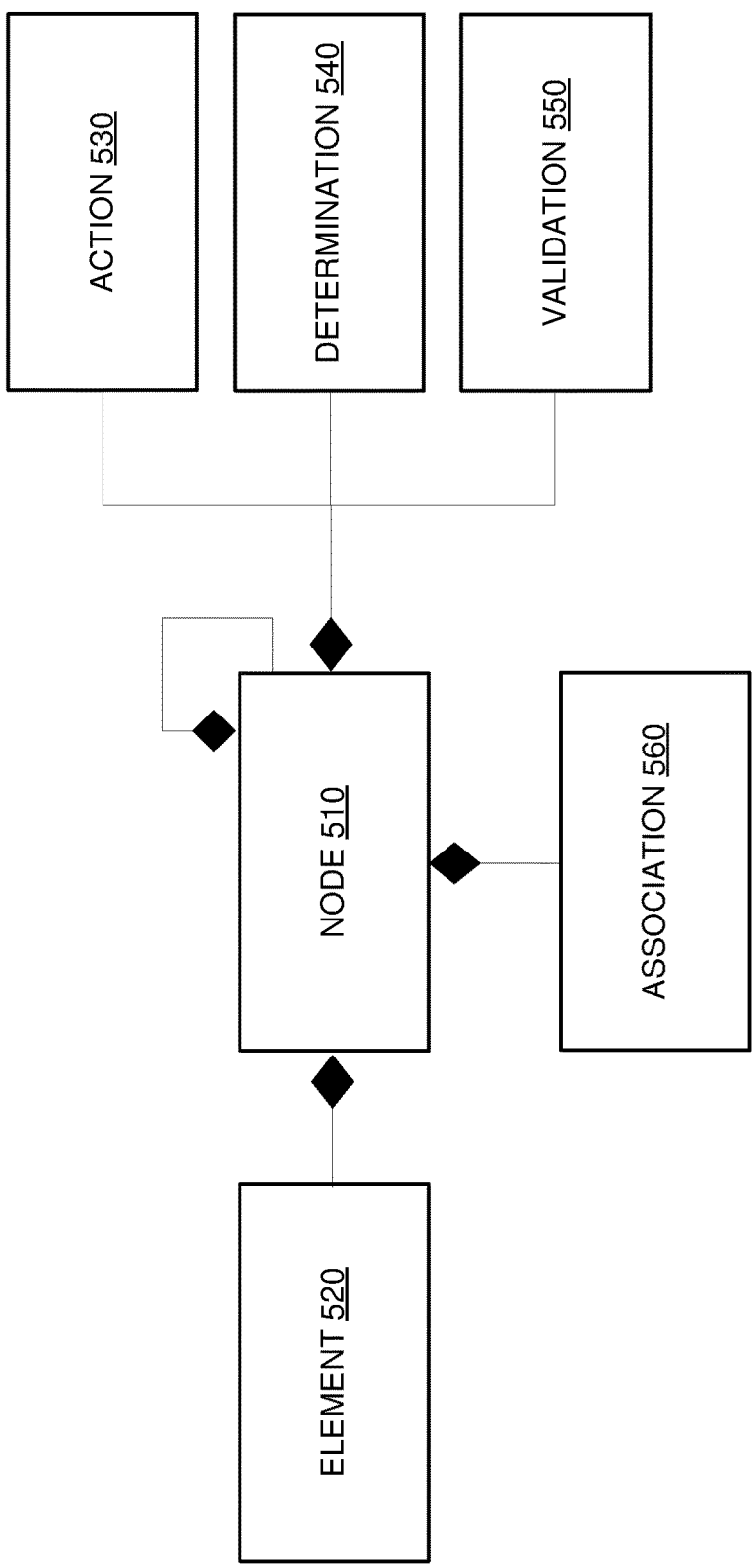
FIG. 5 is a diagram depicting an example source code object schema.

FIG. 5 is a diagram of an example SCO schema 500. A node 510 can contain one or more data elements 520. A data element 520 can contain an identifier, such as a name, and an associated value. In at least some embodiments, the data element 520 can be associated with a data type that restricts and/or validates the type of data that can be stored as a value of the data element 520. The node 510 can contain one or more child nodes 510 (also referred to as sub-nodes), which can themselves contain additional data elements 520. Combinations of sub-nodes 510 and data elements 520 can be used to define a hierarchical data structure of multiple nodes 510. In at least some embodiments, the hierarchical data structure can contain a root node that does not have a parent-node and can be used as an entry point for traversing the hierarchical data structure.

Each node in the SCO can be associated with one or more actions 530. An action 530 can comprise a definition for a logical operation that can be performed using the node 510, with which it is associated. The action 530 can contain an identifier that can be used to invoke the action's logical operation. Each node in the SCO can be associated with one or more determinations 540. A determination 540 can contain a definition for a logical operation that can be automatically executed when a trigger condition is fulfilled. Example trigger conditions can include a modification of the associated node 510, a modification of the data element 520 of the associated node 510, the creation of a data element 520 of the associated node 510, etc. A logical operation defined by an action 530, or a determination 540, can comprise instructions to create, update, read, and/or delete one or more data elements 520 and/or one or more sub-nodes.

Each node in the SCO can be associated with one or more validations 550. A validation 550 can contain a definition of one or more data integrity rules and/or checks. The one or more data integrity rules and/or checks can be performed when the associated node 510, and/or one or more data elements 520 of the associated node 510, are created, modified, and/or deleted. Any such operation that does not satisfy the one or more data integrity rules and/or checks can be rejected.

Each node in the SCO can be associated with one or more nodes from one or more other SCOs by one or more associations 560. An association 560 can contain an identifier for a node in another SCO that is associated with the node 510. Associations 560 can be used to define relationships among nodes in various SCOs. The Association 560, in at least some embodiments, contains an association type indicator that identifies a type of association between the node 510 and the node in the other SCO.

Although the action 530 as defined and associated with the node 510, when the action 530 is invoked, it may target an identified instance of the node 510 with which it is associated. Similarly, a determination 540 and/or validation 550 can be defined and associated with a node 510, but may target an instance of the associated node 510 when it/they is/are invoked. Multiple instances of a given SCO can be created and accessed independently of one another. Although the instances of the SCO share a common schema, the data values stored in their respective node instances and data element instances can differ, as can the SCO instances that are associated by the associations 560. Additionally or alternatively, an instance of an association 560 can identify a particular instance of an associated node in another SCO instance. The identifier of a node instance can be an alphanumeric string that uniquely identifies the instance and, in at least some cases, can be used to look the instance up and/or retrieve data associated with the instance. Particular examples of identifiers include numerical values and universally unique identifiers. However, other types of identifiers are also possible.

Figure 6:
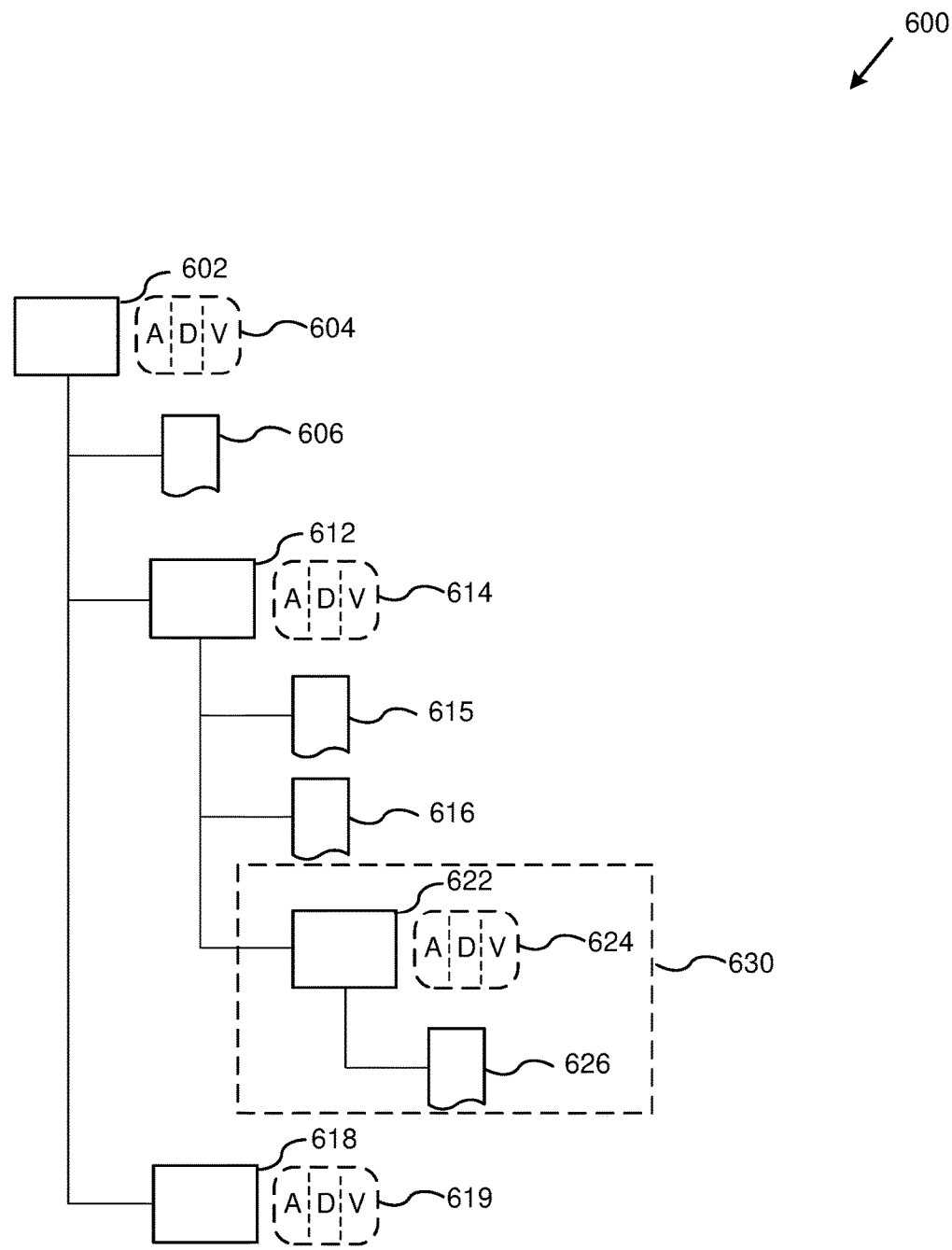
FIG. 6 is a diagram depicting an example source code data object.

FIG. 6 is a diagram depicting an example source code object 600. The SCO 600 comprises a root node 602 which includes sub-nodes 612 and 618, and a data element 606. Optionally, the root node 602 can include one or more actions, associations, determinations, and/or validations 604. The sub-node 612 includes two data elements 615 and 616, and a sub-node 622. Optionally, the sub-node 612 can include one or more actions, associations, determinations, and/or validations 614. The sub-node 618 optionally can include one or more actions, associations, determinations, and/or validations 619. The sub-node 622 includes a data element 626, and optionally can include one or more actions, associations, determinations, and/or validations 624.

In at least some embodiments, a source code object can be extended by one or more extension node definitions. For example, SCO 600 is depicted in FIG. 6 as being extended by an extension node definition 630 which defines the sub-node 622 and data element 626. An extension node definition can be used to add additional nodes, data elements, associations, actions, determinations, and/or validations to an extension node defined in the extension node definition. In some such embodiments, an extension node can represent an inheritance relationship in which a child SCO (represented by sub-node 622) inherits a parent SCO (represented by nodes 602, 612, and 618).

Example 7—Example Application Version History

In any of the examples described herein, an application version history can be provided for tacking changes to a software application. Such application version histories can be created and managed by a version control system (such as GIT, SVN, etc.). Such application version histories can comprise source code objects that can be used to generate machine learning models as described herein.

FIG. 7 is a diagram depicting an example application version history 700 that can be analyzed to generate one or more machine learning models as described herein. The example application version history 700 comprises a plurality of entries, wherein the entries comprise fields corresponding to application version identifiers 710, developer identifiers 720, and change histories 730. The application version identifiers 710 are identifiers associated with the versions of the application that are represented by versions of source code objects for the application that exist as of the time that the entry in the application version history 700 is made. The developer identifiers 720 are identifiers associated with developers that made the source code changes associated with the given application version. The change histories 730 identify versions of one or more source code objects that contain the changes made by the associated developer, which constitute the given version of the application.

For example, the application version 711 is associated with changes made by a developer 721 that are contained in a version 731 of a first source code object. For example, the application version 713 is associated with changes made by another developer 723 that are contained in version 732 of a second source code object and version 733 of a third source code object. The application version 715 is associated with additional changes made by the developer 721. In this case the developer 721 made further changes to the first source code object and these changes are contained in the source code object version 731. The developer 721 also make changes to a fourth source code object that are contained in the source code object version 735. The application version 717 is associated with changes made by the developer 723 that are contained in an additional version 736 of the second source code object and an additional version 737 of the fourth source code object.

A computing device can be configured to use the source code object versions 731-737 contained in the application version history 700 to generate one or more machine learning models for use in identifying candidate developers to assign the source code issues as described herein. For example, the computing device can be configured to analyze the entries in the application version history 700 and identify relationships between developers and source code objects. For example, a computing device can analyze the entries for the application versions 710 and determine that the developer 721 is associated with two versions (731 and 734) of the first source code object and that the second developer is not associated with any versions of the first source code object. Similarly, the computing device can determine that the developer 723 is associated with two versions (732 and 736) of the second source code object and that the developer 721 is not associated with any versions of the second source code object. The computing device can use this information to assign a higher weight to a relationship between the developer 721 and the first source code object than a weight that is assigned to the developer 723 and the first source code object. Additionally or alternatively, the computing device can use this information to assign a higher weight to a relationship between the developer 723 and the second source code object than is assigned to the developer 721 and the second source code object.

Additionally or alternatively, the computing device can determine that the developer 721 is associated with one version (735) of the fourth source code object and that the developer 723 is also associated with one version (737) of the fourth source code object. In at least some scenarios, based on this information the computing device can assign equal weights to a relationship between the developer 721 and the fourth source code object, and a relationship between the developer and 723 and the fourth source code object.

In at least some embodiments the computing device can analyze the contents of the source code object versions 731-737 to identify feature sets associated with the source code objects. The computing device can compare the feature sets associated with the source code objects to one another and determine similarity scores which indicate how similar to the given source code objects are to one another. The similarity scores can be used to train one or more machine learning models. For example, given that the developer 721 and the developer 723 are each associated with one version of the fourth source code object, in isolation equal weights may be assigned to relationships between the developers and the fourth source code object. However, these weight values may be further adjusted based on similarity scores between the fourth source code object and other source code objects which are associated with the developers. For example, the similarity scores may indicate that the fourth source code object is highly similar to the first source code object, which is strongly related to the developer 721. Based on this, the weight assigned to the relationship between the developer 721 and the fourth source code object may be increased to indicate that the developer 721 may be a better candidate to address source code issues arising out of versions of the fourth source code object, even though the developer or 721 and the developer 723 have edited the fourth source code object a same number of times.

Example 8—Example Computing Systems

Figure 8:
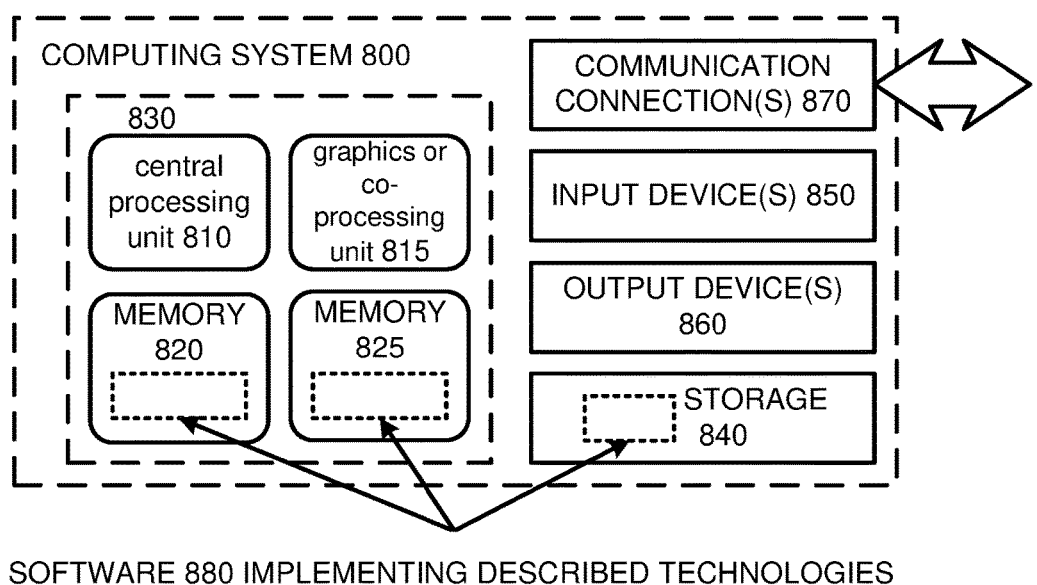
FIG. 8 is a block diagram of an example computing system in which some described embodiments can be implemented.

FIG. 8 depicts a generalized example of a suitable computing system 800 in which the described innovations may be implemented. For example, the computing system 800 can be used as a development computing device, client computing device, and/or server computer as described herein. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, solid state drives, etc.), or some combination of the two, accessible by the processing unit(s). The memory 820, 825 can store software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, solid state drives, CD-ROMs, DVDs, or any other medium which can be used to store information in a non-transitory way and which can be accessed within the computing system 800. The storage 840 can store instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Example Cloud Computing Environment

Figure 9:
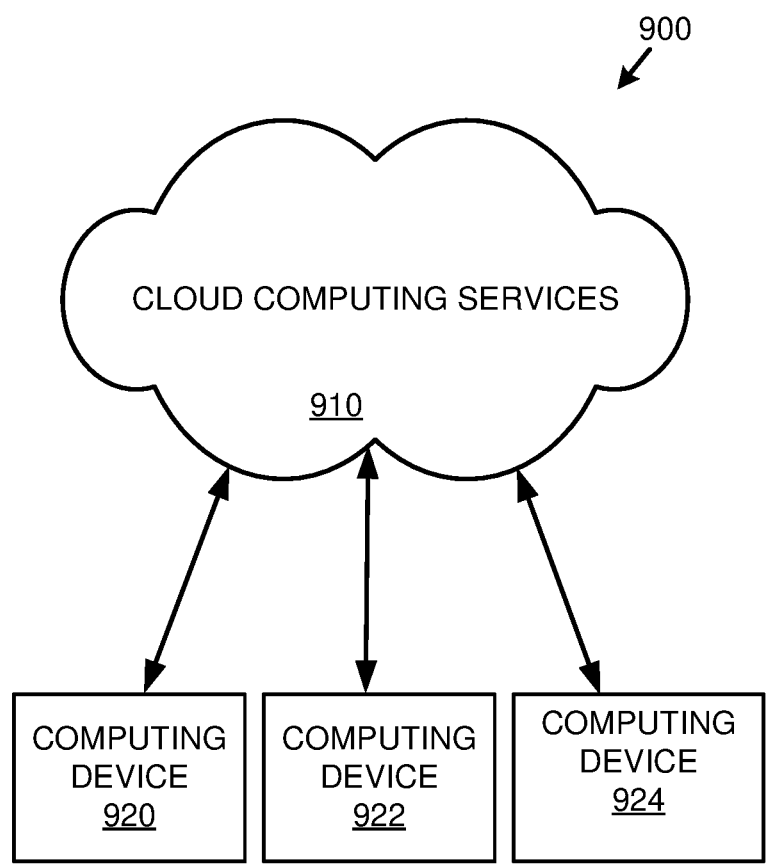
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. For example, one or more computer servers of the cloud computing services 910 can be used as a server as described herein. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like). One or more of the computing devices can be embedded devices that comprise integrated circuits (such as Internet of Things (IoT) devices, etc.).

Example 10—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Python, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method, comprising:
generating a machine learning model using multiple versions of a source code object and identifiers of a plurality of developers associated with the multiple versions of the source code object, wherein the machine learning model is generated by generating feature sets for the multiple versions of the source code object, comparing the feature sets to one another, generating similarity scores for the multiple versions of the source code object based on the comparing, and incorporating the similarity scores into training of the machine learning model;
receiving an additional version of the source code object;
detecting a source code issue in the additional version of the source code object; and
using the machine learning model to identify a developer, of the plurality of developers, as a candidate to correct the source code issue in the additional version of the source code object.

2. The method of claim 1, wherein the generating the machine learning model comprises using multiple versions of a plurality of source code objects, including the source code object.

3. The method of claim 2, wherein the generating the machine learning model comprises:
comparing multiple source code objects, of the plurality of source code objects, that are associated with a same developer identifier; and
determining a coding signature for a developer associated with the developer identifier.

4. The method of claim 2, wherein the generating the machine learning model comprises:
generating feature sets for the multiple versions of the plurality of source code objects;
comparing the feature sets to one another; and
generating similarity scores for the multiple versions of the plurality of source code objects based on the comparing.

5. The method of claim 1, wherein the generating the machine learning model comprises:
identifying one or more source code objects related to the source code object; and
analyzing change histories for the multiple versions of the source code object and the one or more source code objects.

6. The method of claim 5, wherein identifying the one or more source code objects that are related to the source code object comprises determining that the one or more source code objects are in a hierarchical relationship with the source code object.

7. The method of claim 1, wherein the source code issue comprises a static code issue detected during a static source code analysis of the additional version of the source code object.

8. A system, comprising:
a computing device comprising a processor and a memory storing instructions that, when executed by the processor, cause the computing device to perform operations, the operations comprising:
storing a machine learning model generated using multiple versions of a source code object and identifiers of a plurality of developers associated with the multiple versions of the source code object, wherein the machine learning model is generated by generating feature sets for the multiple versions of the source code object, comparing the feature sets to one another, generating similarity scores for the multiple versions of the source code object based on the comparing, and incorporating the similarity scores into training of the machine learning model;

receiving an additional version of the source code object;

detecting a source code issue in the additional version of the source code object; and using the machine learning model to identify a developer, of the plurality of developers, as a candidate to correct the source code issue in the additional version of the source code object.

9. The system of claim 8, wherein the generating the machine learning model comprises:

identifying one or more source code objects related to the source code object; and analyzing the multiple versions of the source code object and multiple versions of the one or more source code objects related to the source code object.

10. The system of claim 9, wherein the identifying the one or more source code objects related to the source code object comprises determining that the one or more source code objects are in a hierarchical relationship with the source code object.

11. The system of claim 8, wherein the generating the features sets for the multiple versions of the source code object comprises generating abstract syntax trees for the multiple versions of the source code object and creating the feature sets using the abstract syntax trees.

12. The system of claim 8, wherein the generating the machine learning model comprises:

identifying versions of the source code object, of the multiple versions of the source code object, that are associated with a same developer identifier; and determining a coding signature for a developer associated with the developer identifier.

13. One or more computer-readable storage media storing instructions that, when executed by one or more processors, cause the one or more processors to perform operations, the operations comprising:

generating a machine learning model using multiple versions of a source code object and identifiers of a plurality of developers associated with the multiple versions of the source code object, wherein the machine learning model is generated by generating feature sets for the multiple versions of the source code object, comparing the feature sets to one another, generating similarity scores for the multiple versions of the source code object based on the comparing, and incorporating the similarity scores into training of the machine learning model;

receiving an additional version of the source code object;

detecting a source code issue in the additional version of the source code object, wherein the source code issue comprises an error detected by static source code analysis or an error or exception detected by dynamic analysis of an application, library, or module containing a compiled representation of the additional version of the source code object; and using the machine learning model to identify a developer, of the plurality of developers, as a candidate to correct the source code issue in the additional version of the source code object.

14. The one or more computer-readable storage media of claim 13, wherein the generating the machine learning model comprises using multiple versions of a plurality of source code objects, including the source code object.

15. The one or more computer-readable storage media of claim 14, wherein the generating the machine learning model further comprises:

comparing multiple source code objects, of the plurality of source code objects, that are associated with a same developer identifier; and determining a coding signature for a developer associated with the developer identifier.

16. The one or more computer-readable storage media of claim 14, wherein the generating the machine learning model comprises:

generating feature sets for the multiple versions of the plurality of source code objects;

comparing the feature sets to one another; and generating similarity scores for the multiple versions of the plurality of source code objects based on the comparing.

17. The one or more computer-readable storage media of claim 16, wherein the generating the features sets for the multiple versions of the plurality of source code objects comprises generating abstract syntax trees for the plurality of source code objects and creating the feature sets using the abstract syntax trees.

18. The one or more computer-readable storage media of claim 13, wherein the generating the machine learning model comprises:

identifying one or more source code objects related to the source code object; and analyzing change histories for the multiple versions of the source code object and the one or more source code objects related to the source code object.

19. The one or more computer-readable storage media of claim 18, wherein identifying the one or more source code objects related to the source code object comprises determining that the one or more source code objects are in a hierarchical relationship with the source code object.

* * * * *